(12) United States Patent
Shires

(10) Patent No.: US 9,061,587 B2
(45) Date of Patent: Jun. 23, 2015

(54) ENERGY CONVERSION DEVICE

(75) Inventor: Ronald Alan Shires, Orlando, FL (US)

(73) Assignee: Ronald Alan Shires, Orlando, FL (US)

( * ) Notice: Subject to any disclaimer, the term of this patent is extended or adjusted under 35 U.S.C. 154(b) by 578 days.

(21) Appl. No.: 13/455,037

(22) Filed: Apr. 24, 2012

(65) Prior Publication Data

US 2013/0280037 A1 Oct. 24, 2013

(51) Int. Cl.
*B60K 25/08* (2006.01)
*F01D 15/02* (2006.01)
*F01D 1/32* (2006.01)

(52) U.S. Cl.
CPC ............. *B60K 25/08* (2013.01); *F01D 15/02* (2013.01); *F01D 1/32* (2013.01)

(58) Field of Classification Search
CPC ............ B60K 25/08; F01D 1/32; F01D 15/02
USPC ................ 417/231, 233; 416/55, 60; 180/165
See application file for complete search history.

(56) References Cited

U.S. PATENT DOCUMENTS

| 3,661,359 | A | 5/1972 | Walker |
|---|---|---|---|
| 3,828,880 | A | 8/1974 | Smith |
| 3,845,623 | A | 11/1974 | DeLancey |
| 3,931,713 | A | 1/1976 | Eskeli |
| 3,949,557 | A | 4/1976 | Eskeli |
| 6,966,394 | B2 | 11/2005 | Fleming |
| 7,677,208 | B2 | 3/2010 | Greenwell |
| 2004/0195063 | A1 | 10/2004 | Simonis |
| 2005/0132700 | A1 | 6/2005 | Newman |
| 2007/0126284 | A1 | 6/2007 | Swain |
| 2009/0134632 | A1 | 5/2009 | Kvisteroy et al. |
| 2010/0263167 | A1 | 10/2010 | Fox |

*Primary Examiner* — Richard Edgar

(57) ABSTRACT

An energy conversion device includes a vehicle. The vehicle includes a wheel. The wheel includes a chamber. The chamber is configured to contain a fluid. The fluid is configured to produce centrifugal energy. The wheel is configured to rotate and produce energy from the centrifugal energy.

19 Claims, 3 Drawing Sheets

ENERGY CONVERSION DEVICE

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to vehicle parts. More particularly, one or more embodiments of the invention relate to vehicle wheels.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, vehicles include at least one wheel. A separate power source is often used to rotate the wheel along an axis. The power transferred to rotational motion of a wheel is typically not recaptured nor reused. Therefore, current methods and systems of powering vehicles often waste energy and may not be ideal.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
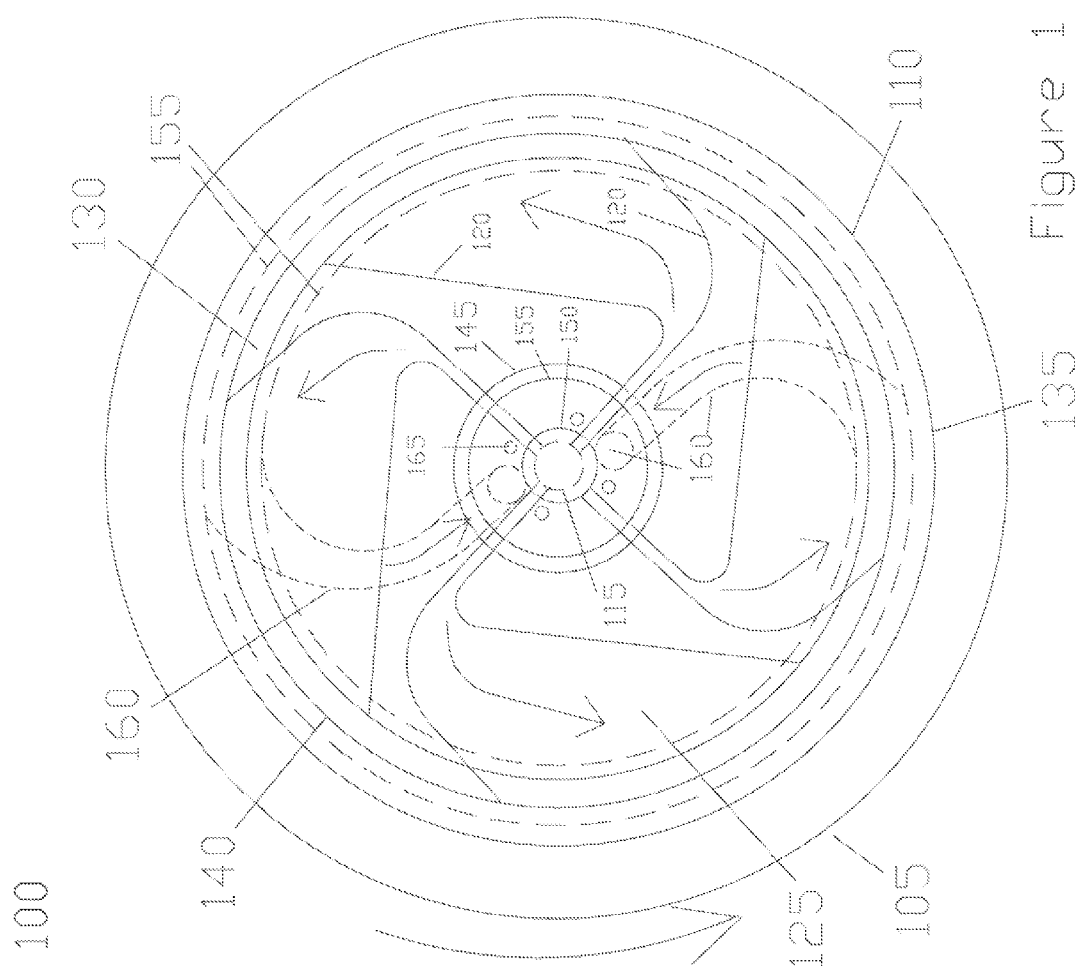
FIG. 1 illustrates an exemplary device configured to produce energy in accordance with an embodiment of the present invention.

Unless otherwise indicated illustrations in the figures are not necessarily drawn to scale.

DETAILED DESCRIPTION OF SOME ALTERNATIVE EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

An embodiment of the present invention provides a device configured to convert a first type of energy into a second type of energy. Suitable types of energy for the first type of energy may include, but are not limited to, centrifugal energy, centripetal energy, hydraulic energy, magnetic energy, elastic energy, mechanical energy, thermal energy, chemical energy, electrical energy, radiant energy, and combinations thereof. Suitable types of energy for the second type of energy may include, but are not limited to, centrifugal energy, centripetal energy, hydraulic energy, magnetic energy, elastic energy, mechanical energy, thermal energy, chemical energy, electrical energy, radiant energy, and combinations thereof. In some alternative embodiments, the device may include a divider, a plurality of chambers and a channel. Suitable materials for the divider include, but are not limited to, metal, rubber, plastic, alloy steel, non-alloy steel, aluminum, composite materials and combinations thereof. In some alternative embodiments, the divider is configured to create a at least one chamber. The channel is configured to supply an amount of fluid to at least one chamber. Suitable fluids include, but are not limited to, water, glycol, liquid nitrogen, liquid hydrogen, liquid helium, oil, diesel fuel, and combinations thereof.

Referring initially to FIG. 1. FIG. 1 illustrates an exemplary device 100 configured to produce energy in accordance with an embodiment of the present invention. The device 100 may include a tire 105 and a wheel 110. In some alternative embodiments, a channel 115 may be provided. Other embodiments include at least one divider 120. Each divider may be configured to create at least one chamber 125. Other embodiments may include at least one of a rotating ring 130, a first rotating disc 135, and a second rotating disc 140. Some alternative embodiments may include at least one of a second disc sealed bearing 145, a first disc sealed bearing 150, and a non-rotating disc 155. Some alternative embodiments of the present invention may include at least one conduit 160. In some alternative embodiments, at least one fastener 165 may be included. Suitable fasteners may include, but are not limited to, lug nuts, pop-rivets, bolts, nuts, screws, adhesives, and clamps. In some alternative embodiments, the divider 120, first rotating disc 135, second rotating disc 140, and rotating ring 130 may be configured to move simultaneously.

Figure 2:
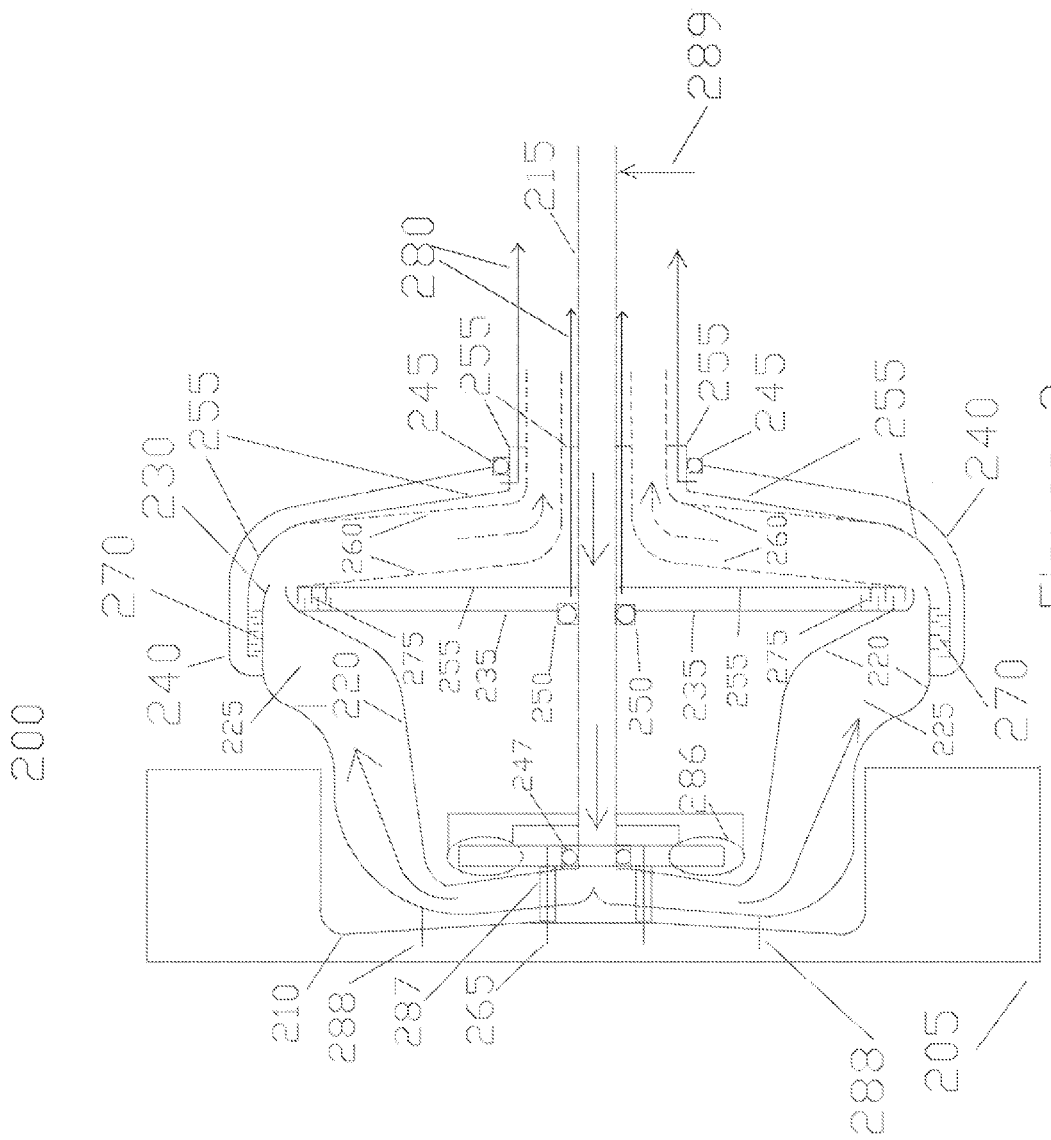
FIG. 2 illustrates a side view of an exemplary device configured to produce energy in accordance with an embodiment of the present invention.

Referring next to FIG. 2. FIG. 2 illustrates a side view of an exemplary device 200 configured to produce energy in accordance with an embodiment of the present invention. The device 200 may include a tire 205 and a wheel 210. In some alternative embodiments, a channel 215 may be provided. Suitable materials for the channel include, but are not limited to metal, rubber, plastic, alloy steel, non-alloy steel, aluminum, composite materials and combinations thereof. Other embodiments include at least one divider 220. Each divider may be configured to create at least one chamber 225. Other embodiments may include at least one of a first rotating disc 235, and a second rotating disc 240. Suitable materials for the first rotating disc include, but are not limited to metal, rubber, plastic, alloy steel, non-alloy steel, aluminum, composite materials and combinations thereof. Suitable materials for the second rotating disc include, but are not limited to metal, rubber, plastic, alloy steel, non-alloy steel, aluminum, composite materials and combinations thereof. Some alternative embodiments may include at least one of a second disc sealed bearing 245, a first disc sealed bearing 250, and a non-rotating disc 255. Suitable materials for the non-rotating disc include, but are not limited to metal, rubber, plastic, alloy steel, non-alloy steel, aluminum, composite materials and combinations thereof. Some alternative embodiments of the present invention may include at least one conduit 260. Suitable materials for the conduit include, but are not limited to metal, rubber, plastic, alloy steel, non-alloy steel, aluminum, composite materials and combinations thereof. In some alternative embodiments, at least one fastener 265 may be included. Suitable fasteners may include, but are not limited to, lug nuts, pop-rivets, bolts, nuts, screws, adhesives, and clamps. In some alternative embodiments, at least one of a first seal 270, a second seal 275, a leak-off line 280, a leak-off return line 289, a wheel disc/bearing 247, a brake 286, and a spacer 287 may be included. In some practical embodiments, the spacer 287 is located between the wheel 210 and wheel disc/bearing 247. In other embodiments a fastener 265 may be provided. In some alternative embodiments a bolt 288 may be provided. In the present embodiment, the bolt 288 is configured to attach the divider 220 to the wheel 210.

In some alternative embodiments there may be at least four dividers 220. In some alternative embodiments, the dividers may be configured to rotate to form chambers 225. In some alternative embodiments, the chambers 225 may rotate. In some alternative embodiments, the rotating chambers are attached to a rotating ring 230. Suitable materials for the rotating ring include, but are not limited to, metal, rubber, plastic, alloy steel, non-alloy steel, aluminum, composite materials and combinations thereof. In some alternative embodiments, the four hollow chambers may be attached to the first rotating disc 235. The rotating ring 230, second rotating disc 240, and first rotating disc 235 may form a continuous 360 degree rotating element. In other embodiments, the second rotating disc 240 may be a 360 degree disc that is attached to the second disc sealed bearing 245. In some alternative embodiments, the second disc sealed bearing 245 may form a sealed interface between the second rotating disc 240 and the non-rotating disc 255. In some alternative embodiments, a lower part of the non-rotating disc 255 extends down and rigidly attaches to the channel 215. In some alternative embodiments, the dividers 220 may be attached to the second rotating disc 240 by a bolted connection for maintenance purposes. In some alternative embodiments, to ensure the fluid does not escape from the system, fluid that does leak past the first seal 270 and the second seal 275, may be contained by the first disc sealed bearing 250, and the second disc sealed bearing 245.

The divider 220 may attach to the rotating ring 230 in some alternative embodiments. In some alternative embodiments the divider may attach to the rotating ring adjacent to the second seal 275 and adjacent to the first rotating disc 235 in some alternative embodiments. The rotating ring 230 may be attached to the first rotating disc 235 in other embodiments. In some alternative embodiments, the first rotating disc 235 may be a 360 degree disc that may be attached to the first disc sealed bearing 250. In some alternative embodiments, the first disc sealed bearing 250 may form a sealed interface between the first rotating disc 235 and the channel 215.

In some alternative embodiments the rotating ring 230 may discharge fluid into the conduit 260. The channel 215 may be attached to at least one of the divider 220, the second rotating disc 240, first rotating disc 235, and rotating ring 230 in some alternative embodiments. In some alternative embodiments, the fluid may travel from the divider 220, through the chamber 225, through the rotating ring 230, and into the conduit 260. In some alternative embodiments, fluid may flow from the non-rotating disc 255 into at least one conduit 260. In some alternative embodiments, the second rotating disc 240 may be attached to the rotating part of the second disc sealed bearing 245 and may seal fluid from leaking to the ambient environment. In some alternative embodiments, the second disc sealed bearing 245 may be fitted to the non-rotating disc 255 and configured such that fluid may be prevented from escaping to the environment. In some alternative embodiments the diameter of the second disc sealed bearing 245 may be 3 inches to 4 inches, however depending on the size and weight of the vehicle may be 4 inches to 12 inches. In some alternative embodiments, the diameter of the first disc sealed bearing 250 may be 1 inch to 2 inches. In other embodiments, the diameter of the first disc sealed bearing 250 may be 2 inches to 6 inches.

The first rotating disc 235 may be attached to the first disc sealed bearing 250 and also may prevent fluid from escaping to the ambient environment in other embodiments. In some alternative embodiments, the channel 215 and first disc sealed bearing 250 may form a seal configured to stop fluid from escaping to the ambient environment. In other embodiments, the first disc sealed bearing 250 and first rotating disc 235 may form an interface between rotating and stationary parts that ultimately may prevent fluid from escaping to the ambient environment. In some alternative embodiments, the fluid may flow from the conduit 260 to a device configured to produce a second type of energy. Suitable devices configured to produce a second type of energy include, but are not limited to a pump, a generator, a compressor, an anti-pollution device, and a drive shaft. After the second type of energy is produced, the fluid may be transported back to the channel 215 in some alternative embodiments.

Figure 3:
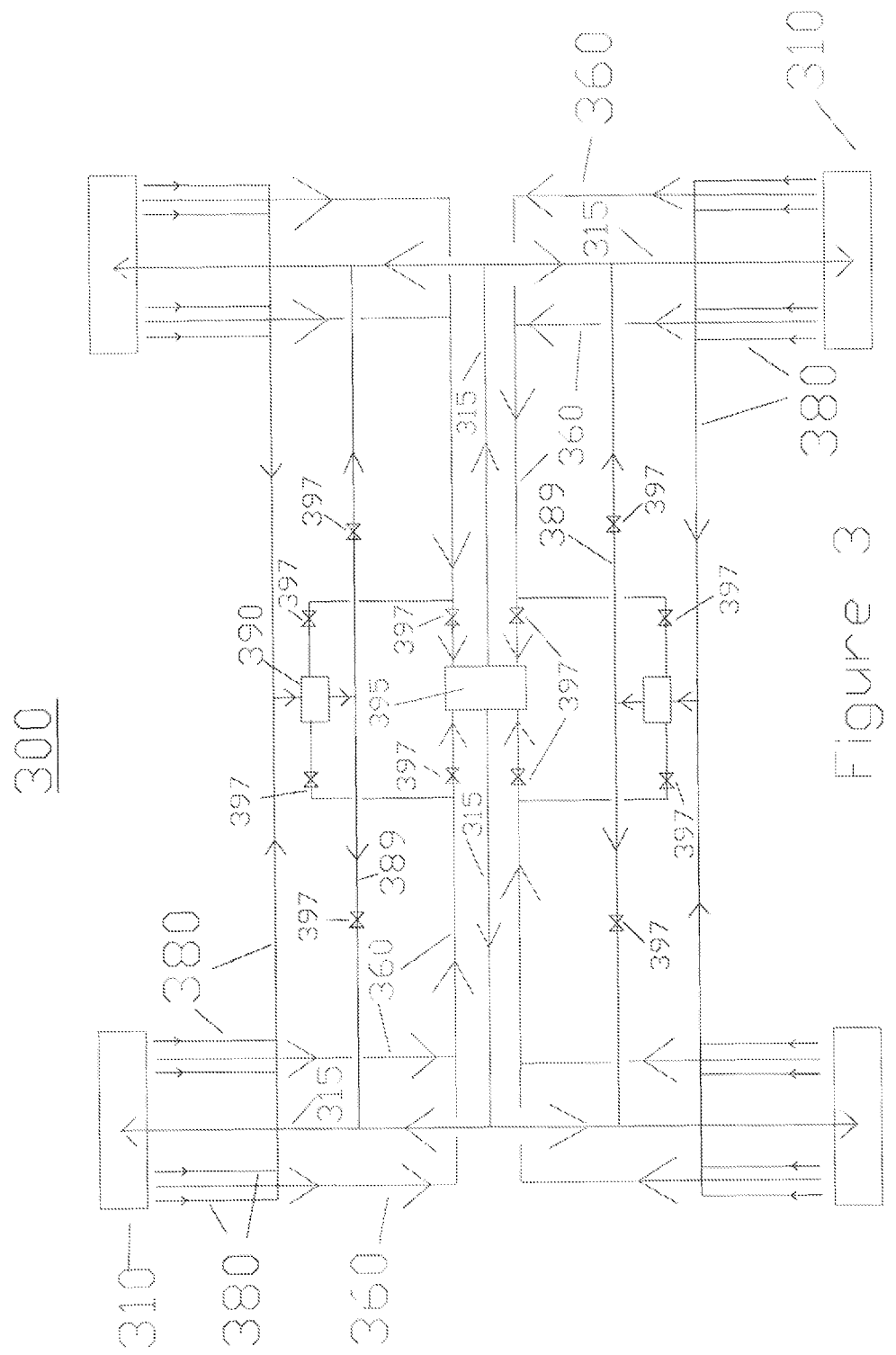
FIG. 3 illustrates a schematic of an exemplary device configured to produce energy in accordance with an embodiment of the present invention.

Referring next to FIG. 3. FIG. 3 illustrates a schematic of an exemplary device 300 configured to produce energy in accordance with an embodiment of the present invention. As shown, exemplary device 300 comprises a wheel 310, a channel 315, a conduit 360, a leak-off line 380, a reservoir 390, a leak-off return line 389, a control valves 397, and a device configured to produce a second type of energy 395 are illustrated. In some alternative embodiments, a fluid contained in the area of the first disc sealed bearing and second disc sealed bearing may be drained to a reservoir 390 through the leak off line 380. In some alternative embodiments, the device may be used in a vehicle, including but not limited to a hybrid vehicle, an electric vehicle, and a locomotive train. Fluid from the reservoir 390 may flow to the non-rotating channel 315 as a vehicle moves at a first speed in some alternative embodiments. In some alternative embodiments the first speed may be 45 to 50 miles per hour (mph). In other embodiments, the first speed may be 1 to 300 mph. In some alternative embodiments, fluid may be stored in the reservoir when the vehicle has reached a second speed. In some alternative embodiments the second speed may be 40 to 44 mph. In other embodiments, the second speed may be 0 to 299 mph. In some alternative embodiments, at the first speed at least one control valve 397 may be opened and at least one control valve 397 may be closed to allow fluid to flow from the reservoir 390 to the channel 315 and to the divider.

In some alternative embodiments, fluid may flow from the rotating chamber to a device configured to produce a second type of energy 395. In some alternative embodiments, as fluid flows from the reservoir 390, to the channel 315, and chamber, air may be displaced from the chamber, first seal, second seal, and an area between the second rotating disc and non-rotating disc and first rotating disc. In other embodiments, the displaced air may flow through the leak-off line 380 back to the reservoir 390. In some alternative embodiments, the fluid may flow from the device configured to produce a second type of energy 395 to the channel 315, through the chamber, through the conduit 360 and back to the device configured to produce a second type of energy 395. In some alternative embodiments, when the vehicle slows to the second speed, for a pre-determined duration of time, at least one control valve 397 may close and at least one control valve 397 may open to allow fluid to flow from the chamber, through the conduit 360, back to the reservoir 390 through control valve 397. In other embodiments as fluid flows into the reservoir 390, air from the reservoir 390 may be displaced through the leak-off line 380, through the area between the second rotating disc and second disc sealed bearing and non-rotating disc, through first seal, second seal, and into the chamber.

In some alternative embodiments, the control valve 397 may be controlled with a smart computer chip. In some alternative embodiments, the smart chip may recognize driving patterns of an individual driver to optimize opening and closing of control valves 397. Suitable sizes for the reservoir 390 include, but are not limited to 10 gallons to 30 gallons. In other embodiments, the volume may be orders of magnitude greater. In some alternative embodiments, a vent may be used to accommodate a positive or negative pressure while heating and cooling of the fluid during thermal expansion and contraction of the fluid. In some alternative embodiments, glycol may be used to avoid boiling or freezing of the fluid.

In some alternative embodiments, tubing may be used. In some embodiments, the tubing may be used to join at least two of, the tire, the wheel, the channel, the conduit, the leak-of line, and the leak-off return line. In many embodiments, the tubing may be braided. Suitable materials for the tubing include, but are not limited to metal, rubber, plastic, alloy steel, non-alloy steel, aluminum, composite materials and combinations thereof. In some embodiments, the tubing may be flexible.

Examples of other useful applications include, but are not limited to, using energy produced as a motive force to rotate the automobile driveshaft directly in any application, power an air conditioning system, an engine coolant water pump, a power steering pump, and a hydraulic brake fluid pump. If used with a hybrid vehicle then the energy produced may be used to significantly increase the automobile manufactures published highway miles per gallon in some alternative embodiments. In some alternative embodiments the device may recharge batteries and increase the time required between recharging batteries.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of converting a first type of energy to a second type of energy according to the present invention will be apparent to those skilled in the art. The invention has been described above by way of illustration, and the specific embodiments disclosed are not intended to limit the invention to the particular forms disclosed. For example, the particular implementation of the device may vary depending upon the particular context or application. The devices described in the foregoing were directed to physical implementations; however, similar techniques of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. An energy conversion device comprising:
a wheel comprising a chamber, said chamber being configured to contain a fluid, said chamber being further configured to impart a centrifugal force onto said fluid, said force being sufficient to give said fluid a centrifugal energy, said wheel being further configured with a non-rotating disc that is operable to receive the rotating fluid, and, as a result, produce useable energy from said fluid.

2. The energy conversion device of claim 1, in which the wheel further comprises a first seal, said first seal being configured to prevent said fluid from leaking from said chamber.

3. The energy conversion device of claim 1, in which said chamber further comprises a rotating ring, said rotating ring being configured to discharge said fluid into a conduit.

4. The energy conversion device of claim 1, in which said non-rotating disc comprises a first disc sealed bearing, said first disc sealed bearing being configured to prevent said fluid from leaking from said chamber.

5. The energy conversion device of claim 1, said fluid being configured to flow from a conduit to a device, said device being configured to produce energy.

6. The energy conversion device of claim 5, further comprising flexible tubing, said flexible tubing being configured to join said wheel and said conduit.

7. The energy conversion device of claim 1, further comprising a reservoir, said reservoir being configured to contain said fluid, said wheel being configured to travel at a first speed and a second speed.

8. The energy conversion device of claim 7, said reservoir being configured to release at least a portion of said fluid into said chamber when said wheel travels at said first speed.

9. The energy conversion device of claim 7, further comprising a control valve, said control valve being configured to open or close when said wheel travels at said first speed.

10. The energy conversion device of claim 9, further comprising a smart computer chip, said smart computer chip being configured to control the opening or closing of said control valve.

11. An energy conversion device comprising:
a vehicle comprising a wheel, said wheel comprising a chamber, said chamber being configured to contain a fluid, said fluid being configured to produce centrifugal energy, said wheel being configured to rotate, said wheel being operable to produce mechanical or electrical energy from said centrifugal energy, said electrical energy being operable to power said vehicle.

12. The energy conversion device of claim 11, in which the wheel further comprises a first seal, said first seal being configured to prevent said fluid from leaking from said chamber.

13. The energy conversion device of claim 11, in which said chamber further comprises a rotating ring, said rotating ring being configured to discharge said fluid into a conduit.

14. The energy conversion device of claim 11, said fluid being configured to flow from a conduit to a device, said device being configured to produce energy.

15. The energy conversion device of claim 14, further comprising flexible tubing, said flexible tubing being configured to join said wheel and said conduit.

16. The energy conversion device of claim 11, further comprising a reservoir, said reservoir being configured to contain said fluid, said vehicle being configured to travel at a first speed and a second speed.

17. The energy conversion device of claim 16, said reservoir being configured to release at least a portion of said fluid into said chamber when the vehicle travels at said first speed.

18. The energy conversion device of claim 16, further comprising a control valve, said control valve being configured to open or close when said vehicle travels at said first speed.

19. The energy conversion device of claim 18, further comprising a smart computer chip, said smart computer chip being configured to control the opening or closing of the control valve.

* * * * *